(12) United States Patent
Li

(10) Patent No.: US 8,248,529 B2
(45) Date of Patent: Aug. 21, 2012

(54) METHOD AND ASSOCIATED DEVICE FOR DISPLAYING CAPTION WINDOWS IN TELEVISION

(75) Inventor: Cheng Hao Li, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 707 days.

(21) Appl. No.: 12/481,244

(22) Filed: Jun. 9, 2009

(65) Prior Publication Data

US 2010/0013994 A1    Jan. 21, 2010

(30) Foreign Application Priority Data

Jul. 15, 2008    (TW) .............................. 97126837 A

(51) Int. Cl.
*H04N 11/00* (2006.01)
(52) U.S. Cl. ........................................................ 348/468
(58) Field of Classification Search ........................ None
See application file for complete search history.

(56) References Cited

U.S. PATENT DOCUMENTS

| 2001/0009445 A1* | 7/2001 | Chung | 348/556 |
| 2001/0040640 A1* | 11/2001 | Kim | 348/461 |
| 2006/0170819 A1* | 8/2006 | Lim et al. | 348/385.1 |

* cited by examiner

*Primary Examiner* — Nasser Goodarzi
*Assistant Examiner* — An Nguyen
(74) *Attorney, Agent, or Firm* — WPAT., P.C.; Justin King

(57) ABSTRACT

A method for displaying caption windows in a TV system is provided. The method includes steps of receiving a first window-defining command at a first time point, receiving a second window-defining command at a second time point, and determining an output state of the window-defining commands according to a comparison result between a first global priority value corresponding to the first window-defining command and a second global priority value corresponding to the second window-defining command. The first global priority value includes a first priority value of the first window-defining command and a first age parameter. The second global priority value includes a second priority value of the second window-defining command and a second age parameter. The first and second age parameters are associated with a sequence of the first and second time points.

13 Claims, 4 Drawing Sheets

METHOD AND ASSOCIATED DEVICE FOR DISPLAYING CAPTION WINDOWS IN TELEVISION

CROSS REFERENCE TO RELATED PATENT APPLICATION

This patent application is based on a Taiwan, R.O.C. patent application No. 097126837 filed on Jul. 15, 2008.

FIELD OF THE INVENTION

The present invention relates to a method and associated device for displaying caption windows, and more particularly, to a method and associated device for displaying a caption window in a digital television.

BACKGROUND OF THE INVENTION

Digital television programs globally increase. Demands of digital televisions are inevitably expanding day by day. Current digital televisions are divided into two main-stream categories, namely the European Digital Video Broadcasting (DVB) standard, and the American ATSC standard (ATSC). The American digital television specifications have an especially defined captioning standard, Digital Television Closed Captioning (DTVCC), for hearing-impaired individuals. Under a mute condition, apart from showing dialogues between characters, the DTVCC also displays descriptive sentences on events occurring on the screen. For example, descriptive sentences are displayed when there are background sounds on the screen to help hearing-impaired individuals to better understand the plot.

Video signals containing closed captioning, sent from a head-end of a DTV or outputted from a DVD player by accessing a DVD, along with a window-defining command for defining the DTVCC, are decoded by a built-in captioning decoder in an ATSC digital television to display the closed captioning. The image signals along with the captioning are then displayed on a display panel. In the prior art, a captioning decoder is generally achieved using a specialized independent chip.

The DTVCC specifications allow a maximum of eight window-defining commands DF0 to DF7 in a video signal from a DTV head-end or a DVD player. More specifically, when being fully supported by a DTV system, a DTV display is able to simultaneously display eight caption windows. However, in practical applications, it is rarely that more than three caption windows are displayed at the same time, so that a standard of simultaneously displaying only four caption windows is provided in a DTV of minimum function requirements. That is, in some DTVs, certain caption windows shall not be displayed when the video signal contains more than four caption windows.

According to the DTVCC specifications, a window-defining command is defined with numerous fields as shown in FIG. 1. For example, a window ID field is filled with values from 0 to 7; and a priority field representing a display priority of caption windows is similarly filled with values from 0 to 7, where 0 has the highest priority and 7 has the least priority. Accordingly, the DTV determines caption windows not to be displayed based on the values in the priority field. Nevertheless, priorities of multiple caption windows sent from a head-end system are generally set as the highest; thus, the prior art may not effectively determine which caption windows should not be displayed and result in errors in displaying the caption windows. It is therefore an objective of the invention to overcome the various shortcomings of the prior art.

SUMMARY OF THE INVENTION

The present invention discloses a method for displaying a caption window in a DTV. The method comprises steps of receiving a first window-defining command at a first time point, receiving a second window-defining command at a second time point, determining an output state of the window-defining commands according to a comparison result between a first global priority value corresponding to the first window-defining command and a second global priority value corresponding to the second window-defining command. The first global priority value associates with a first priority value of the first window-defining command a first age parameter. The second global priority value associates with a second priority value of the second window-defining command a second age parameter. The first and second age parameters associate with a sequence of the first and second time points. Preferably, the output state of the window-defining commands determines whether to display caption windows corresponding to the window-defining command on the television. Preferably, the output state of the window-defining commands represents an overlapping sequence of the caption windows corresponding to the window-defining commands. Preferably, the priority values are represented by most significant bits (MSBs) of the global priority values, and the age parameters are represented by least significant bits (LSBs) of the global priority values. Preferably, a first buffer and a second buffer are allocated according to the sequence of the first and the second time points, and the first and the second age parameters are associated with numbers of the buffers.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
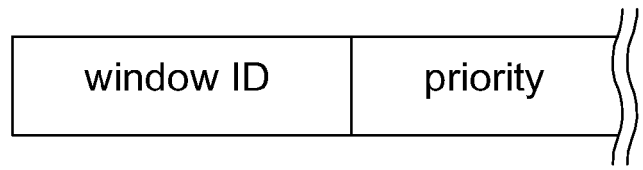
FIG. 1 is a schematic diagram showing fields of a window-defining command.
Figure 2:
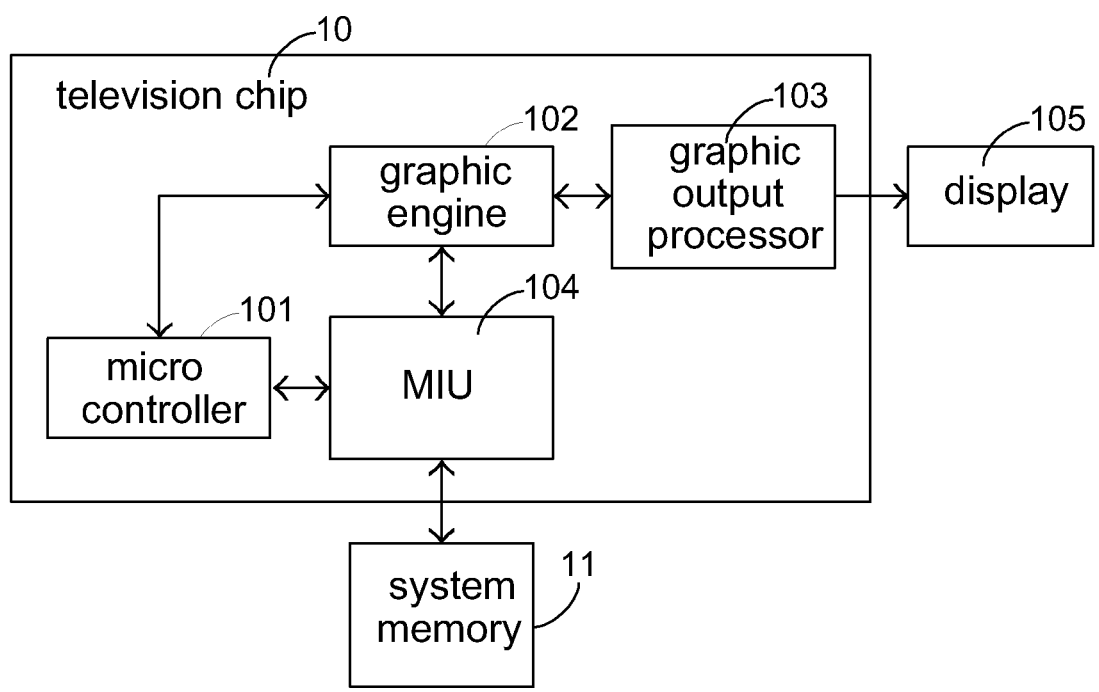
FIG. 2 is a function block diagram of a television system capable of displaying caption windows according to one embodiment of the invention.

FIG. 2 shows a function block diagram of a television system capable of displaying caption windows according to one embodiment of the invention. The television system comprises a television chip 10, and a system memory 11 external to the television chip 10. For example, the system memory 11 is a dynamic random access memory (DRAM). The television chip 10 comprises a microcontroller 101, a graphic engine 102, a graphic output processor 103, a memory interface unit 104 and a display 105. The present invention introduces a concept of "age" indicating a sequence that the window-defining command appears. When the television chip 10 receives the appearing sequence of the window-defining command, an age parameter is introduced with an original priority value to generate a global priority value, which is then provided to the graphic output processor 103 for subsequent display processing. Different weight ratio or algorithm can be applied on the displayed priority values and the age parameter in determining the displaying sequence For example, since a maximum of eight window-defining commands DF0 to DF7 of eight window IDs are allowed in a video signal, there are eight original priority values P0 to P7 that can be represented by 3 bits. The number of age parameters introduced by the invention may also be 8 correspondingly, wherein 0 represents a first-appearing window-defining command and 7 represents an eighth-appearing window-defining command. The original priority value and the age parameter are combined to generate a global priority value, of which, for example, three most significant bits (MSBs) are the original priority value and the three least significant bits (LSBs) are the age parameter. Accordingly, when the graphic output processor 103 outputs caption windows corresponding to the window-defining commands to the display 105, the first four caption windows having the highest priorities based on a sequence of the global priority values are displayed. The sequence of the global priority values may also be applied to an overlapping sequence when displaying the windows; for example, a caption window having a higher priority is shown on top of a caption window having a lower priority.

Figure 3A:
FIGS. 3A and 3B are schematic diagrams illustrating display operations of the caption windows according to one embodiment of the invention.
Figure 3B:
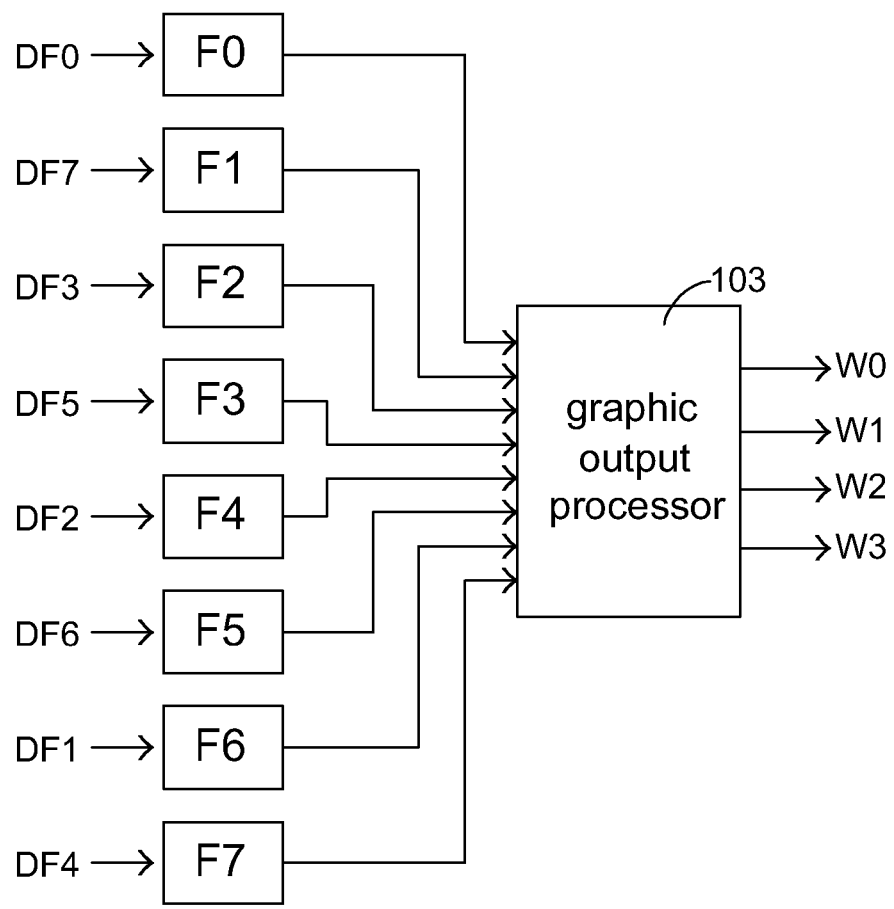

Referring to FIGS. 3A and 3B showing schematic diagrams illustrating display operations of the windows according to an embodiment of the invention. FIG. 3A shows an example of receiving a series of window-defining commands. FIG. 3B shows the television chip in sequence allocating a plurality of buffers in the system memory corresponding to the window-defining commands. The buffers are successively programmed as F0 to F7 according to an appearing sequence of the window-defining commands. For example, a first received window-defining command, e.g., the window with a window ID DF0, is forwarded to a buffer F0, with number 0, and stored therein. The global priority value by attaching the 3-bit age parameter behind the original priority value P0 is also stored into the buffer F0. Any later received window-defining command with a window ID of DF0 is regarded as an update version of an existing window, not a newly-opened window, and is yet forwarded to the buffer F0 and stored therein. However, supposing that the window ID is different, e.g., when a window-defining command DF7 is received, the different window-defining command is forwarded to a buffer F1, with number 1, and stored therein. Similarly, the global priority value by attaching the 3-bit age parameter behind the original priority value P1 is also stored into the buffer F1. Accordingly, window-defining commands having window IDs newly appearing sequentially and forwarded to corresponding buffers F0 to F7. For each window, 3-bit age parameters are attached behind the original priority values Pn to generate the corresponding global priority values. It should be noted that the numbers of the buffers not only correspond to the appearing sequence of the window-defining commands but also match with the concept of the aforesaid age parameters. In this embodiment, the numbers of the buffers corresponding to the window-defining commands are applied to represent the age parameters. For example, the number of the buffer corresponding to the first received window-defining command is 0, and the 3-bit age parameter is also set to 0, so that the last three bits of the 6-bit global priority value generated from the original priority value P0 (000) and the age parameter are 000. The number of the buffer corresponding to the second received window-defining command is 1, and the 3-bit age parameter is also set to 1, so that the last three bits of the 6-bit global priority value generated from the original priority value P1 and the age parameter are 001. Similarly, the last three bits of the 6-bit global priority value of the third received window-defining command are 010, the last three bits of the 6-bit global priority value of the fourth received window-defining command are 011, the last three bits of the 6-bit global priority value of the fifth received window-defining command are 100, the last three bits of the 6-bit global priority value of the sixth received window-defining command are 101, the last three bits of the 6-bit global priority value of the seventh received window-defining command are 110, and the last three bits of the 6-bit global priority value of the third received window-defining command are 111. Therefore, when the graphic output processor 103 utilizes the global priority values for arranging a display sequence, the last three bits determine that the four caption windows W0, W1, W2 and W3 having the highest priorities are to be shown even though the original priority values P0 to P7 are the same values.

Figure 4:
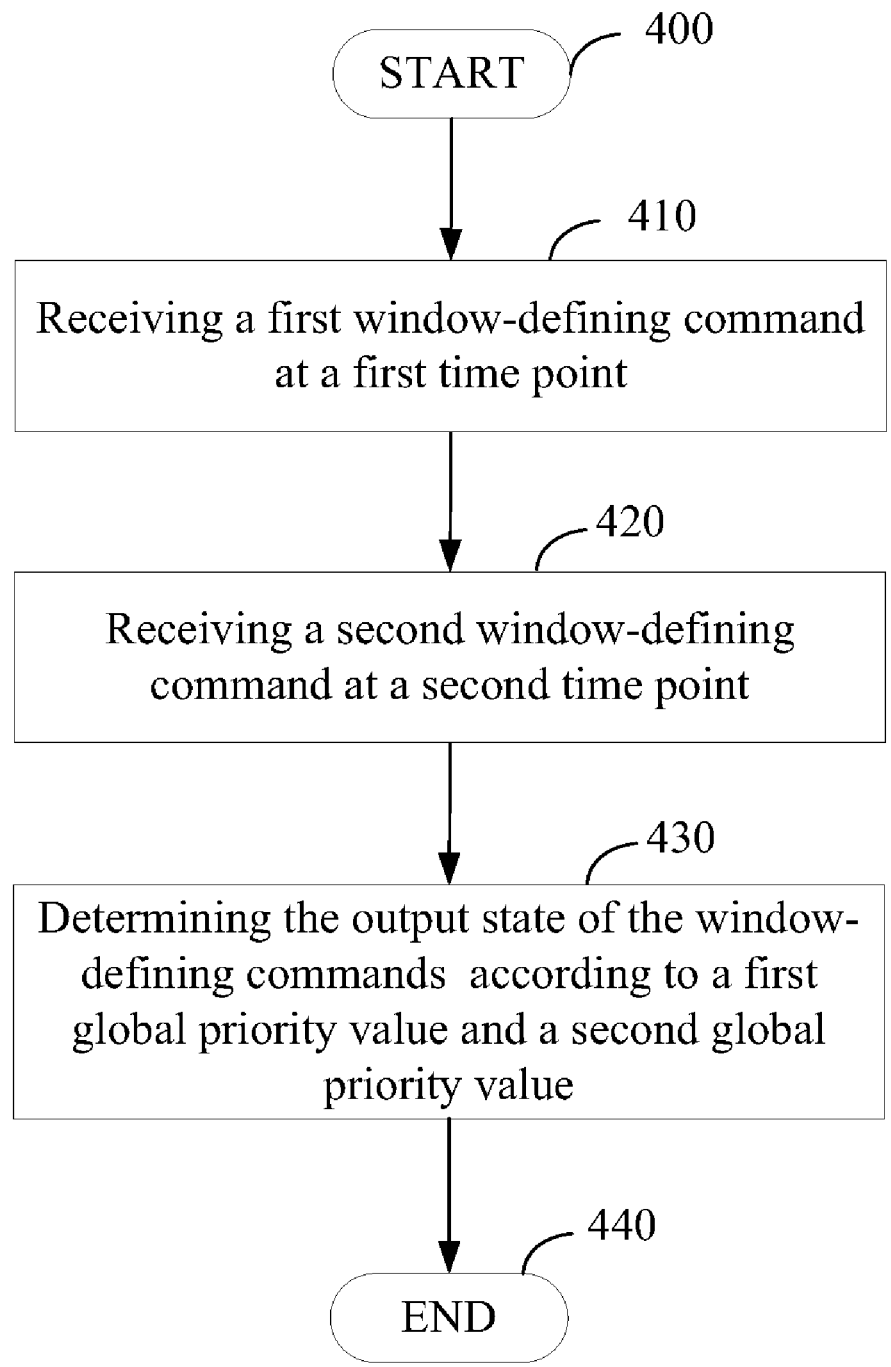
FIG. 4 is a flowchart of a method for displaying caption windows in a DTV according to one embodiment of the invention.

FIG. 4 shows a flowchart of a method for displaying caption windows in a DTV according to one embodiment of the invention. The method begins with Step 400. In Step 410, a first window-defining command is received at a first time point. In Step 420, a second window-defining command is received at a second time point. In Step 430, an output state of the window-defining commands is determined according to a comparison result between a first global priority value corresponding to the first window-defining command and a second global priority value corresponding to the second window-defining command. The first global priority value comprises a first priority value of the first window-defining command and a first age parameter. The second global priority value comprises a second priority value of the second window-defining command and a second age parameter. The first and second age parameters are associated with a sequence of the first and second time points. For example, the output state of the window-defining commands represents an overlapping sequence of the caption windows of the window-defining commands. The method ends with Step 440.

Figure 5:
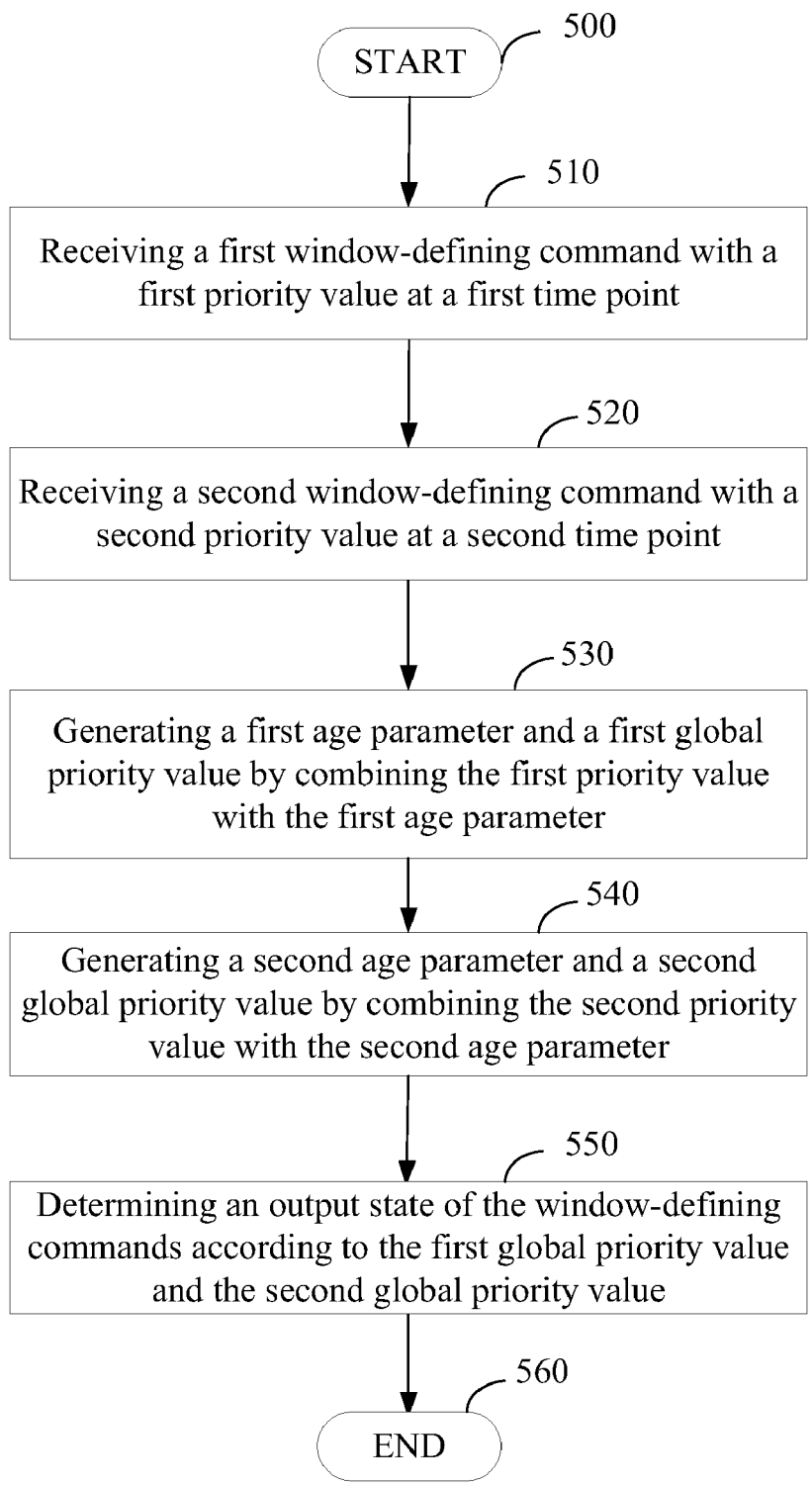
FIG. 5 is a flowchart of a method for displaying caption windows in a DTV according to another embodiment of the invention.

FIG. 5 shows a flowchart of a method for displaying caption windows in a DTV according to another embodiment of the invention. The method begins with Step 500. In Step 510, a first window-defining command comprising a first priority value is received at a first time point. In Step 520, a second window-defining command comprising a second priority value is received at a second time point. In Step 530, a first age parameter is generated in response to the first time point of the first window-defining command, and the first priority value is combined with the first age parameter to generate a first global priority value. In Step 540, a second age parameter is generated in response to the second time point of the second window-defining command, and the second priority value is combined with the second age parameter to generate a second global priority value. In Step 550, an output state of the window-defining commands is determined according to a comparison result between the first global priority value and the second global priority value. Preferably, the priority value is represented by the MSBs of the global priority value, and the age parameter is represented by the LSBs of the global priority value. The method ends with Step 560.

The foregoing method is implemented to the hardware structure shown in FIG. 2. Therefore, the invention further discloses a DTV applying a global priority for displaying a caption window. The DTV comprises a television chip and a system memory. The television chip receives a first window-defining command at a first time point, receives a second window-defining command at a second time point, and determines an output state of the window-defining commands according to a comparison result between a first global priority value corresponding to the first window-defining command and a second global priority value corresponding to the second window-defining command. The first global priority value comprises the first priority value of the first window-defining command and a first age parameter. The second global priority value comprises a second priority value of the second window-defining command and a second age parameter. The system memory, coupled to the television chip, allocates a first buffer and a second buffer according to a sequence of the first time point and the second time point. The first and second age parameters are associated with the sequence of the first and second time points.

Summing up, the present invention discloses a method for displaying a plurality of caption windows on a display screen of a digital television (DTV), comprising steps of: displaying the caption windows on the display screen, each the displayed windows relating to a displayed priority value and an displayed age parameter, wherein the age parameters are associated with a chronological order among the displayed windows; receiving an incoming window-defining command associated with an incoming priority value and an incoming age parameter; determining a global priority in response to the incoming priority value and the incoming age parameter; and updating the caption windows to be displayed on the display screen in response to the global priority. For example, the updating step determines an overlapping sequence of the caption windows in response to the global priority. The priority values are represented by most significant bits (MSBs) of the global priority values, and the age parameters are represented by least significant bits (LSBs) of the global priority values. A buffer with a sequence number is allocated according to the chronological order, and the incoming age parameter is associated with the sequence number of the buffer.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for displaying a plurality of caption windows on a display screen of a digital television (DTV), comprising steps of:
    displaying the caption windows on the display screen, wherein each of the displayed windows has a displayed priority value and an displayed age parameter, and the displayed age parameters are associated with a chronological order among the caption windows;
    receiving an incoming window-defining command associated with an incoming priority value and an incoming age parameter;
    determining a global priority in response to the incoming priority value and the incoming age parameter; and
    updating the caption windows to be displayed on the display screen in response to the global priority;
    wherein the incoming priority value represents most significant bits (MSBs) of the global priority, and the incoming age parameter represents least significant bits (LSBs) of the global priority.

2. The method for displaying the caption windows as claimed in claim 1, wherein the updating step further determines an overlapping sequence of the caption windows in response to the global priority.

3. The method for displaying the caption windows as claimed in claim 1, wherein a buffer with a sequence number is allocated according to the chronological order, and the incoming age parameter is associated with the sequence number of the buffer.

4. A method for displaying caption windows in a digital television, comprising steps of:
    receiving a first window-defining command with a first displayed priority value;
    receiving a second window-defining command with a second displayed priority value;
    generating a first age parameter of the first window-defining command according to a chronological order, and combining the first displayed priority value with the first age parameter to generate a first global priority value;
    generating a second age parameter of the second window-defining command according to the chronological order, and combining the second displayed priority value with the second age parameter to generate a second global priority value; and
    determining an output state according to the first global priority value and the second global priority value; P1 wherein the displayed priority values are represented by MSBs of the global priority values, and the age parameters are represented by LSBs of the global priority values.

5. The method for displaying the caption windows as claimed in claim 4, wherein the output state of the window-defining commands determines whether to display the caption windows corresponding to the window-defining commands.

6. The method for displaying the caption windows as claimed in claim 4, wherein the output state of the window-defining commands represents an overlapping sequence of the caption windows corresponding to the window-defining commands.

7. The method for displaying the caption windows as claimed in claim 4, wherein a first buffer and a second buffer are allocated according to the chronological orders of the window-defining commands, and the first age parameter and the second age parameter associate with sequence numbers of the buffers.

8. A digital television capable of displaying a first caption window associated with a first window-defining command and a second caption window associated with a second window-defining command, comprising:
    a television chip, for receiving the first window-defining command with a first displayed priority value, receiving the second window-defining command with a second displayed priority value, and determining an output state of the window-defining commands according to a comparison result between a first global priority value of the first window-defining command and a second global priority value of the second window-defining command; and
    a system memory, coupled to the television chip, for allocating a first buffer and a second buffer associated with the first window-defining command and the second window-defining command respectively;
    wherein, the first global priority value associates with the first displayed priority value and a first age parameter, the second global priority value associates with the second displayed priority value and a second age parameter, and the first age parameter and the second age parameter associate with sequence numbers of the first buffer and the second buffer, respectively; and wherein the displayed priority values are represented by MSBs of the global priority values, and the age parameters are LSBs of the global priority values.

9. The digital television as claimed in claim 8, wherein the output state of the window-defining commands determines whether to display the caption windows corresponding to the window-defining commands.

10. The digital television as claimed in claim 8, wherein the output state of the window-defining commands represents an overlapping sequence of the caption windows corresponding to the window-defining commands.

11. The digital television as claimed in claim 8, wherein the television chip, receives the first window-defining command and the second window-defining command at a first time point and a second time point, respectively.

12. The digital television as claimed in claim 11, where in the system memory allocates the first buffer and the second buffer according to a sequence of the first time point and the second time point.

13. The digital television as claimed in claim 11, wherein the television chip generates the first age parameter and the second age parameter in response to the first time point and the second time point respectively, combines the first displayed priority value with the first age parameter to generate the first global priority value, and combines the second displayed priority value with the second age parameter to generate the second global priority value.

* * * * *